United States Patent [19]

Stanley, Jr.

[11] Patent Number: 5,120,450
[45] Date of Patent: Jun. 9, 1992

[54] ULTRAVIOLET RADIATION/OXIDANT FLUID DECONTAMINATION APPARATUS

[76] Inventor: E. Glynn Stanley, Jr., 372 Blue Jay Way, Napa, Calif. 94559

[21] Appl. No.: 457,449

[22] Filed: Dec. 27, 1989

[51] Int. Cl.$^5$ ............................ C02F 1/32; C02F 1/72
[52] U.S. Cl. ..................................... 210/748; 210/759; 210/760; 210/94; 210/205; 422/24; 422/186.3; 250/435
[58] Field of Search .............. 210/94, 95, 198.1, 205, 210/748, 758, 759, 760; 422/24, 186.3, 186.07; 250/436, 437, 432, 435; 219/121.84, 121.8

[56] References Cited

U.S. PATENT DOCUMENTS

| | | |
|---|---|---|
| 3,634,025 | 1/1972 | Landry . |
| 3,700,406 | 10/1972 | Landry . |
| 3,894,236 | 7/1975 | Hazelrigg ............................ 250/435 |
| 4,101,777 | 7/1978 | Reid . |
| 4,179,616 | 12/1979 | Coviello et al. . |
| 4,230,571 | 10/1980 | Dadd . |
| 4,265,747 | 5/1981 | Copa et al. .......................... 210/758 |
| 4,273,660 | 6/1981 | Beitzel . |
| 4,274,970 | 6/1981 | Beitzel . |
| 4,327,276 | 4/1982 | Injushin et al. ..................... 219/121 |
| 4,548,716 | 10/1985 | Boeve . |
| 4,609,471 | 9/1986 | Beemster et al. . |
| 4,661,264 | 4/1987 | Goudy ................................ 210/748 |
| 4,752,401 | 6/1988 | Bodenstein . |
| 4,792,407 | 12/1988 | Zeff et al. . |
| 4,798,702 | 1/1989 | Tucker . |
| 4,816,145 | 3/1989 | Goudy ................................ 210/96.1 |
| 4,913,827 | 4/1990 | Nebel . |

OTHER PUBLICATIONS

Robert W. Legan, "Ultraviolet Light Takes on CPI Role", Chemical Engineering (Jan. 25, 1982), pp. 95–100.

*Primary Examiner*—Peter Hruskoci
*Assistant Examiner*—Robert James Popovics
*Attorney, Agent, or Firm*—Skjerven, Morrill, MacPherson, Franklin & Friel

[57] ABSTRACT

An ultraviolet radiation/oxidation fluid decontamination apparatus is provided which includes a container made of high tensile strength material through which the fluid to be treated flows, a high intensity, directed beam light source, a small ultraviolet transparent window through which the directed beam propagates, and an oxidant injection port. The container interior is lined with a reflective surface which distributes the light throughout the container and a non-sticking surface which prevents fouling of the container. Organic contaminates are oxidized to carbon dioxide, water and other nonharmful products during the fluid treatment carried out by this apparatus.

8 Claims, 3 Drawing Sheets

ULTRAVIOLET RADIATION/OXIDANT FLUID DECONTAMINATION APPARATUS

FIELD OF THE INVENTION

This invention relates to an ultraviolet radiation/oxidation apparatus for the decontamination of fluids using a high intensity, directed light source and a fluid container made of high tensile strength material.

BACKGROUND OF THE INVENTION

The combination of ultraviolet radiation and oxidant is a powerful tool for the removal of organic and microbial contaminants from fluids, particularly water. Ultraviolet radiation/oxidation systems are faster and capable of oxidizing more types of chemicals than systems using ultraviolet radiation or oxidant alone. Both hydrogen peroxide and ozone are suitable oxidants for use in ultraviolet radiation/oxidation systems, but ozone is more economical and therefore more often used.

Ozone alone is a strong oxidizing agent that can react with all oxidizable contaminants in the fluid; however, the rate of oxidation can be enhanced by the simultaneous application of ultraviolet radiation. According to equation 1, ultraviolet radiation accelerates the decay of ozone dissolved in water to the hydroxyl radical (.OH), one of the most powerful oxidants known.

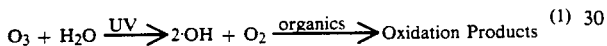
(1)

Oxidation of organic contaminants by ultraviolet radiation and ozone ultimately yields non-harmful products, carbon dioxide, water and oxygen according to Equation 2. The application of ultraviolet radiation and ozone for control of microbial contamination is also a very efficient process because the cell wall of the microorganism is ruptured, killing the organism.

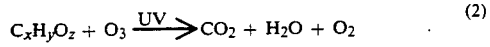
(2)

Known ultraviolet radiation/oxidation systems suffer a serious disadvantage, however. Typically a germicidal ultraviolet lamp is enclosed in a sleeve which is immersed in the fluid to be treated so that the ultraviolet radiation propagates through the fluid. In prior art systems these sleeves have been made of quartz, one of the few materials that is transparent to the high energy, short wavelength ultraviolet light that promotes the reactions described above Quartz sleeves often require cleaning due to water caused fouling. A film tends to accumulate on the quartz sleeve which decreases transmission of the ultraviolet radiation to the fluid. The frequent mechanical or chemical cleaning which is required to remove the film is extremely inefficient since it requires shutting down the fluid decontamination system and draining the fluid to reach the surfaces needing cleaning. Furthermore, quartz which is subjected to ultraviolet light is solarized, producing a slightly tan color in the quartz which also reduces transmission. Most importantly, quartz sleeves are fragile and expensive.

Immersion of the quartz sleeve in the fluid to be treated disrupts the straight forward flow of the fluid through the reaction vessel and creates eddies and subcurrents such that all the fluid is not irradiated or exposed to the oxidant to an equal extent. Therefore, the contaminants are inefficiently treated.

SUMMARY OF THE INVENTION

According to this invention an ultraviolet radiation/oxidation apparatus is provided which minimizes the disadvantages associated with quartz and immersion of a quartz sleeve into the fluid to be treated. In addition, the ultraviolet radiation/oxidation apparatus of this invention allows fluid treatment at high or low pressures and it tolerates sudden pressure changes.

One embodiment of this invention provides a high tensile strength alloy or steel container with a reflective interior surface that is lined with an inert, non-sticking material which is transparent to ultraviolet radiation, such as fluorinated ethylene propylene. The non-stick nature of fluorinated ethylene propylene prevents fouling of the container's interior which simplifies cleaning and maintenance of the ultraviolet radiation/oxidation apparatus. An oxidant is injected into the fluid which is irradiated with ultraviolet light while in the container.

A high intensity, directed beam of ultraviolet radiation enters the container through an ultraviolet transparent window, and because the beam is directed, the window can be small. If the window is quartz, its small size simplifies cleaning and reduces the expense associated with prior art quartz sleeves. The quartz window may be lined with, or otherwise protected by, fluorinated ethylene propylene to prevent fouling of the window, further simplifying maintenance of the apparatus.

The use of a directed, high intensity light source rather than a diffuse light source, such as the germicidal lamps used in the prior art, eliminates the need for reflectors or some other system of collecting and directing the diffuse light. Most importantly, the use of high intensity light according to this invention directs more the desired oxidation more efficiently, leading to shorter reaction times.

The reflective interior surface of the container repeatedly reflects the ultraviolet radiation, thereby irradiating a substantial portion of the container's volume. The ultraviolet transparent lining which covers the reflective interior surface allows this reflection.

The high tensile strength material forming the container allows the treatment of fluids at high or low pressures and tolerates sudden pressure changes.

By avoiding immersion of an ultraviolet lamp and its quartz sleeve into the fluid, the apparatus according to this invention allows straightforward flow of the fluid, and therefore avoids the generation of eddies and subcurrents that can cause some portions of the fluid to be inefficiently treated.

DETAILED DESCRIPTION OF THE INVENTION

Figure 1:
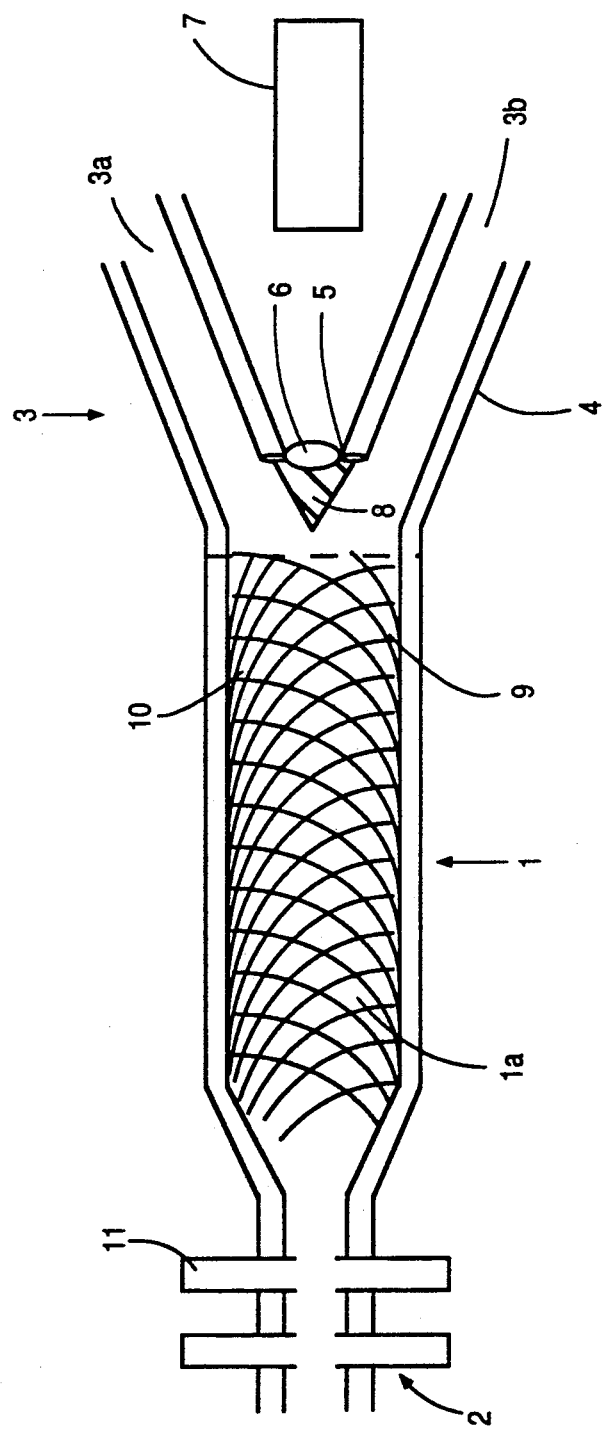
FIG. 1 is a sectional view of one embodiment of an ultraviolet radiation/oxidation apparatus according to this invention.

Referring to FIG. 1, fluid enters a high tensile strength alloy or steel container 1 from inflow source 2. Fluid exits the container 1 through an out-flow chamber 3 having one or more dispersing pipes, shown here as pipes 3a and 3b, also made of a high tensile strength material. Outflow chamber 3 and container 1, which may form a "Y," are joined as described below. The reaction vessel of an apparatus according to this invention comprises container 1, inflow source 2 and out-flow chamber 3. At the base of the converging pipes 3a and 3b, a window 6 is seated in an opening which is sealed like a port-hole with an ozone impervious gasket 5 and the necessary plates (not shown). The light source 7 produces a high intensity ultraviolet light beam directed toward window 6 which is made of a material transparent to ultraviolet radiation, such as quartz.

The interior of container 1 is formed with a surface 9 that is highly reflective to ultraviolet radiation, such as polished aluminum. The light beam from light source 7 passes through window 6 and is repeatedly reflected by the interior of container 1 so that a substantial portion of the volume of container 1 is irradiated. Window 6 can be formed so that the light beam from light source 7 is flared by passing through window 6, thereby irradiating a substantial portion of the container's volume. Alternatively, the light may be scattered throughout container 1 by ridges 1a formed by routing the interior of container 1. Reflective surface 9 covers the entire interior of container 1, both the ridged and routed areas.

The interiors of container 1 and out-flow chamber 3 are lined with a material that is chemically inert under conditions encountered by the apparatus during oxidation of organic contaminants. The material lining the interior of container 1 should also be transparent to ultraviolet radiation so that the lining does not prevent reflection of ultraviolet radiation by surface 9. The lining 10 will protect container 1 and inflow 2, and lining 4 will protect out-flow chamber 3, from corrosion and fouling caused by the similarly protected by cone shaped lining 8 which can be integrally formed lining 4. The cone shape of lining 8 will facilitate fluid flow and aid in the prevention of eddies and subcurrents by directing the fluid flow to pipes 3a and 3b. The linings 10, 4 and 8 may be attached to the reaction vessel by any suitable, fluid-tight means as described below.

Fluoridated ethylene propylene can provide the non-wetting, non-sticking, but ultraviolet transparent linings 10, 4 and 8 required. This material prevents film accumulation on the interior walls of container 1 and out-flow chamber 3 caused by contaminants in the fluid being treated, thereby simplifying cleaning and maintenance of the apparatus. Prevention or removal of film accumulated on the interior of container 1 is important because the film would decrease the reflectivity of reflective surface 9, and therefore would decrease the efficiency of ultraviolet light transfer throughout container 1. In addition, fluorinated ethylene propylene is chemically inert to most substances and it will not deteriorate under long exposure to ultraviolet light.

The base of inflow 2 has an injection port 11 for injecting an oxidant such as hydrogen peroxide or ozone. Ozone can be produced as needed with an ozone generator according to well known methods. A plurality of injection ports may be used to increase the quantity and the rate of oxidant addition.

Figure 2:
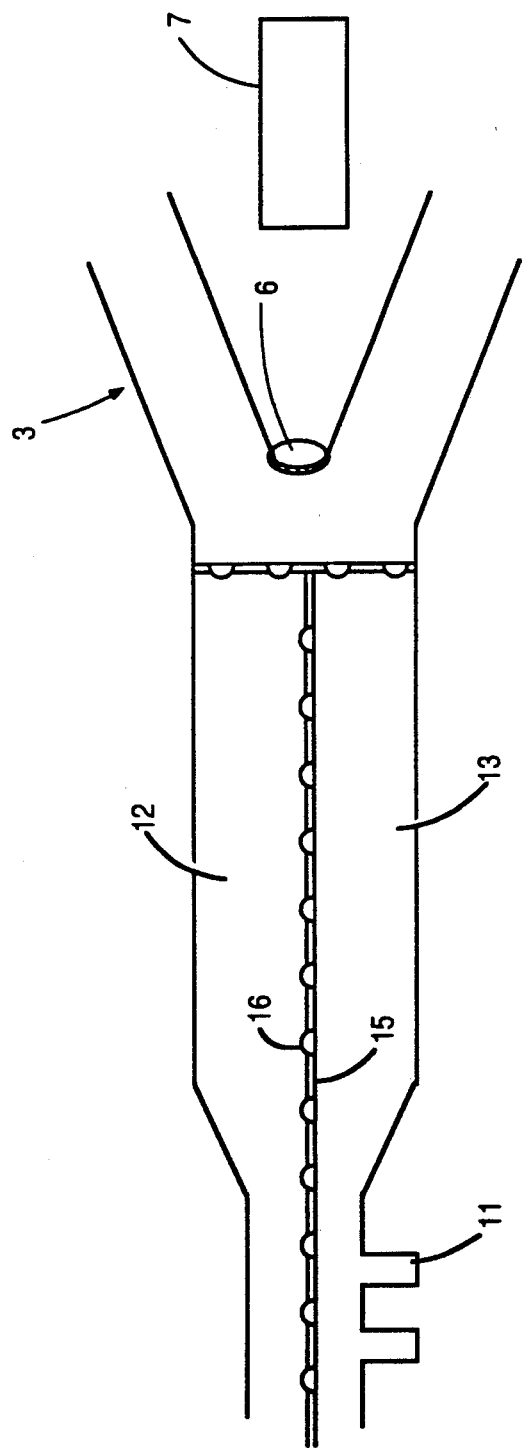
FIG. 2 is a side view of the assembled apparatus shown in FIG. 1.
Figure 3:
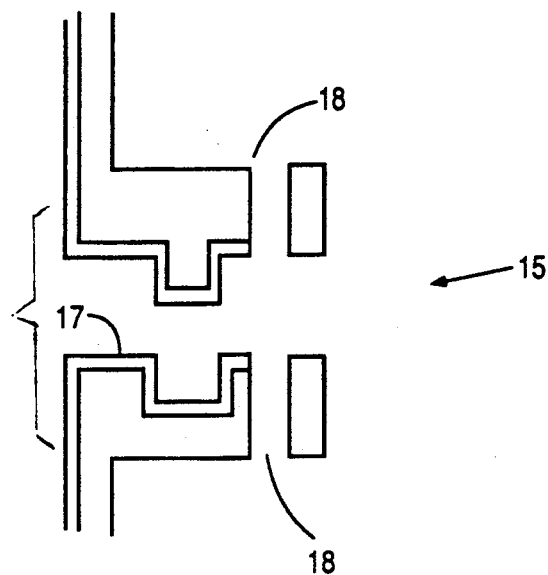
FIG. 3 shows a typical mated flange for joining the sections of the apparatus in FIG. 2.

FIG. 2 illustrates a side view of the apparatus described above. Container 1 and inflow 2 are assembled from two half shells, upper half 12 and lower half 13, both of which have flanged edges 15 which are mated and securely fastened with bolts 16. Out-flow chamber 3 is a solid, one piece unit also having a flange 15 which mates with a flange of assembled container 1 and is fastened to container 1 with bolts 16. A typical mated flange 15 is shown in FIG. 3. Gasket 17 made of a material which is impervious to ozone, such as teflon, is positioned to form a fluid-tight seal between the joined, bolted sections. The bolt 16 is inserted through bolt hole 18.

Because the apparatus can be disassembled and the interior is easily accessible, this construction simplifies cleaning and maintenance of the interior, including replacement of the linings 10 and 4 and of the window 6. The lining 10 can be formed in 2 pieces which fit halves 12 and 13 so that each half will be lined by one continuous segment of fluorinated ethylene propylene material. The lining 4, integrally formed with cone shaped lining 8, can be formed as a one piece unit which conforms to the one-piece out-flow chamber 3. The linings 10 and 4 may extend to a position between mated flanges 15 so that the linings act as a gasket. This configuration also insures secure attachment of the linings 10 and 4 to the container 1 and the out-flow chamber 3, respectively.

Ridges 1a formed by routing the interior of container 1 will also stabilize placement of the lining 10 in container 1. The ridges are preferably arranged in a crisscross, diamond pattern. Lining 10 is pressed or molded to fill the routed areas and covers the ridges so that the interior of container 1 presents a smooth, lined surface. Consequently, lining 10 is formed with a varying thickness having indentations corresponding to the ridges 1a of container 1. The coupling of these ridges and indentations prohibits any movement of lining 10 relative to container 1 by locking the lining in place. The smooth surface of lining 10 facilitates direct fluid flow, as is necessary to prevent the generation of eddies and subcurrents in the reaction vessel.

Figure 4:
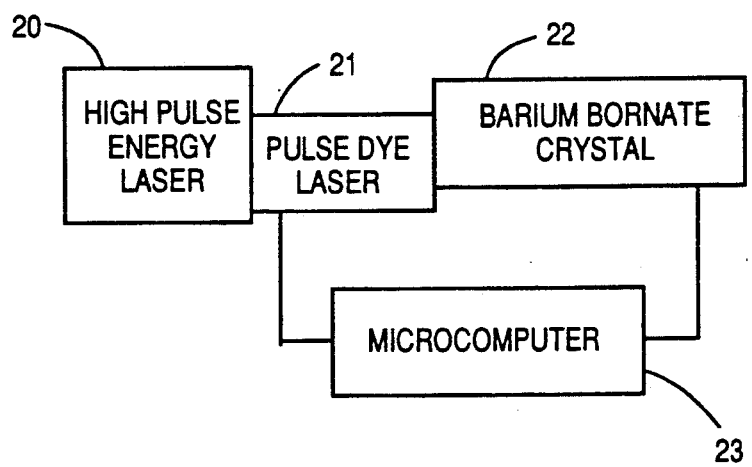
FIG. 4 is a schematic view of a laser system for producing a directed beam of ultraviolet light.
Figure 5:
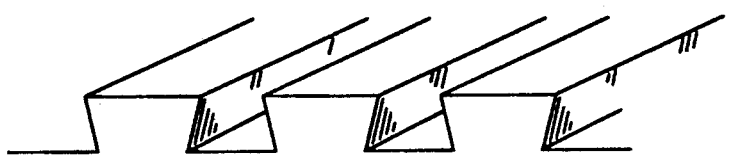
FIG. 5 shows one embodiment of ridges formed by routing of the container.

The light source 7 may be a laser or a configuration of lasers according to FIG. 4. High pulse energy Nd:YAG laser 20 produces a beam with a wavelength of 355 nm which acts as a pump source for the pulsed dye laser 21. The dye for pulsed dye laser 21 is chosen to allow the laser configuration according to FIG. 4 to ultimately produce an output beam in the ultraviolet range. The frequency of the beam from pulsed dye laser 21 is doubled using a barium-borate crystal 22 to achieve the desired wavelength spectrum. A microprocessor scan control unit 23 is connected to both the pulsed dye laser 21 and the barium-borate crystal 22 to control the final wavelength of light produced.

With this configuration of lasers a beam with a wavelength of 254 nm can be produced and directed through window 6 into container 1. This wavelength, which is diffusely produced by germicidal lamps, is known to be effective for promoting the oxidation of organic contaminates in the presence of an oxidant.

This apparatus can be operated with a continuous flow of fluid. Alternatively, longer reaction times may be achieved by recirculating the fluid from the dispersing pipes 3a and 3b to the inflow 2 or by holding the fluid in container 1 while continuing oxidant injection and ultraviolet irradiation.

The flow rate of the fluid, the rate of oxidant injection and the wavelength of the laser output beam can be adjusted to achieve optimum results, meaning minimum residual contamination in practically short reaction times. The optimum conditions will depend on the degree of initial contamination, the desired level of purification, the nature of the contaminants and the amount of fluid to be treated.

I claim:

1. A fluid decontamination apparatus which promotes oxidation of organic contaminants in said fluid comprising:

a reaction vessel through which fluid flows, said reaction vessel being composed of a high tensile strength alloy or steel material;

said reaction vessel having an interior surface, said interior surface being lined with a chemically inert, non-stick material, said material also being transparent to ultraviolet radiation;

said interior surface comprising a plurality of ridges wherein said chemically inert material covers said ridges, said ridges stabilizing placement of said chemically inert, non-stick material;

a window mounted on said reaction vessel, said window being transparent to ultraviolet radiation;

said window being protected from contact with said fluid by a window cover formed from said chemically inert, non-stick material, said material also being transparent to ultraviolet radiation;

an ultraviolet radiation source positioned so that said ultraviolet radiation propagates through said window; and means for adding oxidant to said fluid.

2. The fluid decontamination apparatus of claim 1 further comprising:

an inflow source through which fluid enters said reaction vessel; and an outflow pipe through which fluid exits said reaction vessel, said outflow pipe and said inflow source being composed of a high tensile strength alloy or steel material.

3. The fluid decontamination apparatus of claim 2 wherein said reaction vessel has a reflective interior surface.

4. The fluid decontamination apparatus of claim 1 wherein said chemically inert material is fluorinated ethylene propylene.

5. The fluid decontamination apparatus of claim 4 wherein said ultraviolet radiation source produces a high intensity, directed light beam.

6. The fluid decontamination apparatus of claim 5 wherein said ultraviolet radiation source comprises a laser.

7. The fluid decontamination apparatus of claim 5 wherein said window comprises flare means to flare said high intensity, directed light beam as said light beam passes through said window.

8. A method of organic removal from a fluid comprising the steps of:

(a) providing a reaction vessel through which said fluid flows, said reaction vessel composed of a high tensile strength alloy or steel material;

said reaction vessel having an interior surface lined with a chemically inert, non-stick material, said material also being transparent to ultraviolet radiation;

said interior surface comprising a plurality of ridges wherein said chemically inert material covers said ridges, said ridges stabilizing placement of said chemically inert, non-stick material;

a window mounted on said reaction vessel, said window being transparent to ultraviolet radiation;

an ultraviolet radiation source positioned adjacent said window; and, means for adding oxidant to said fluid, and, (b) passing said fluid through said reaction vessel, (c) simultaneously exposing said fluid to radiation from said ultraviolet radiation source, and, (d) adding oxidant to said fluid resulting in organic molecular disassociation by creating hydroxyl radicals.

* * * * *